United States Patent [19]

Rosen

[11] Patent Number: 4,468,989
[45] Date of Patent: Sep. 4, 1984

[54] POWER TRANSMISSION MECHANISM WITH A HYDROKINETIC TORQUE CONVERTER HAVING A LOCKUP CLUTCH

[75] Inventor: Stanley D. Rosen, Southfield, Mich.

[73] Assignee: Ford Motor Company, Dearborn, Mich.

[21] Appl. No.: 319,830

[22] Filed: Nov. 9, 1981

[51] Int. Cl.³ .................... B60K 41/12; F16H 47/00; F16H 3/74

[52] U.S. Cl. .................................... 74/869; 74/730; 74/752 C

[58] Field of Search ............... 74/867, 868, 869, 730, 74/752 C, 856

[56] References Cited

U.S. PATENT DOCUMENTS

| | | | |
|---|---|---|---|
| 2,987,942 | 6/1961 | Jania | 74/752 |
| 3,022,676 | 2/1962 | Duffy | 74/868 |
| 3,295,387 | 1/1967 | Leonard et al. | 74/472 |
| 3,400,612 | 9/1968 | Pierce, Jr. | 74/864 |
| 3,683,721 | 8/1972 | Uozumi et al. | 74/868 |
| 3,706,240 | 12/1972 | Borneman et al. | 74/869 |
| 3,714,836 | 2/1973 | Pierce, Jr. et al. | 74/752 C |
| 4,106,369 | 8/1978 | Taga | 74/869 |
| 4,226,309 | 10/1980 | Siliberschlag | 192/3.31 |
| 4,346,626 | 8/1982 | Kawamoto | 74/867 |

Primary Examiner—Allan D. Herrmann
Assistant Examiner—Bruce F. Wojciechowski
Attorney, Agent, or Firm—Donald J. Harrington; Keith L. Zerschling

[57] ABSTRACT

A control valve system for an automatic power transmission mechanism having planetary gearing defining plural torque delivery paths comprising fluid pressure servo operated brakes and clutches and a vehicle speed sensitive servo release shuttle valve which cooperates with the timing valve circuit to establish a first timed relationship between the application and release of the servos during a ratio change from the high ratio to an intermediate underdrive ratio at a relatively high speed and for establishing a different timing relationship between those circuit elements during a corresponding ratio change at a lower vehicle speed, the rate of application of the underdrive ratio servo during a ratio change from the lowest ratio to an intermediate underdrive ratio being calibrated independently of the calibration required for a ratio change from the high speed ratio to the same intermediate underdrive ratio.

5 Claims, 7 Drawing Figures

POWER TRANSMISSION MECHANISM WITH A HYDROKINETIC TORQUE CONVERTER HAVING A LOCKUP CLUTCH

GENERAL DESCRIPTION OF THE INVENTION

My invention comprises a control system for a hydrokinetic torque converter transmission of the kind shown, for example, in U.S. Pat. No. 3,400,612. The mechanism of that patent shows a hydrokinetic torque converter having an impeller, a turbine and a stator, the impeller being driven by an internal combustion engine and the turbine being connected to torque input elements of planetary gearing. The gearing of that patent, as well as the gearing disclosed in this application, provides three forward driving speed ratios and a single reverse ratio, the highest speed ratio being a direct drive. Clutches and brakes establish each of the various driving ratios, a first brake providing a reaction point during low speed ratio operation and a second reaction brake providing a separate reaction point during intermediate underdrive speed ratio operation. Direct drive is achieved as the brakes are released and the clutches are applied so that the elements of the gearing rotate in unison with the turbine.

The brake that establishes a reaction point during intermediate speed ratio operation comprises a servo cylinder and a double acting servo piston which cooperates with the cylinder to define opposed pressure chambers. The dimensions of the piston are such that when both pressure chambers are pressurized the piston is stroked to a brake release position. When pressure on the apply side of the piston is increased and the pressure on the release side of the piston is exhausted, the piston is stroked thereby displacing fluid from the release side of the piston as the intermediate speed ratio brake becomes applied.

The release side of the brake servo piston is in fluid communication with the clutch that is engageable to establish direct drive operation. Thus the brake is released and the clutch is applied in synchronism during an upshift, and the clutch is released and the brake is applied in synchronism during a downshift.

I am aware of various control schemes for controlling timing of the application of the brake with the respect to the release of the clutch, and vice versa, during upshifts and downshifts between the direct drive ratio and the intermediate speed ratio. Examples of these control schemes can be found by referring to U.S. Pat. Nos. 3,706,240; 3,295,387 and 3,714,836, which are assigned to the assignee of this invention. U.S. Pat. No. 3,400,612, for example, shows a 1-2 shift capacity scheduling and accumulator valve that regulates the pressure made available to an intermediate speed ratio brake to establish a controlled rate of engagement. This valve timing scheme requires the use of an accumulator valve so that the duration of a shift interval can be calibrated as appropriate, the length of the interval being determined by the stroke of the accumulator valve and the volume of the fluid that is displaced by it against the opposing force of the valve spring. A 3-2 shift timing valve and accumulator combination for regulating 3-2 downshifts is disclosed also in U.S. Pat. No. 3,706,240. This, in effect, regulates the pressure made available to the servo as the servo piston is displaced and the high speed ratio clutch is released. A similar system is shown in U.S. Pat. No. 3,714,836.

U.S. Pat. No. 2,987,942, which also is assigned to the assignee of this invention, provides a timing control for effecting coasting downshifts that require disengagement of a clutch and engagement of a brake. This system is distinguished from the others, above described, by the introduction of a governor speed sensitive control that provides a variable degree of restriction in the exhaust flow path that is common to the high speed ratio clutch and the release side of the brake. This provides a higher degree of restriction when the vehicle is traveling at high speeds and a downshift is initiated than the degree restriction required for a corresponding downshift at low speeds.

My present invention is distinguished from the devices of these references although, like the device shown in U.S. Pat. No. 2,987,942, it is speed sensitive. The speed sensitivity is achieved, however, without the requirement for a pressure regulator valve that senses governor pressure. The speed sensitive portions of the present valve system comprise a servo release shuttle valve that controls distribution of pressure from the release side of the brake and the direct drive clutch by routing it through either a high speed orifice arrangement or a low speed orifice arrangement. The timing circuit includes a 1-2/3-2 timing control valve and a 3-2 timing valve in addition to the shuttle valve.

The timing control valve distinguishes a shift from the low ratio to the intermediate ratio from a shift from a high ratio to the intermediate ratio. The shuttle valve acts in cooperation with the 3-2 timing valve to control the flow pattern through the orifices so that at high speeds a downshift from the high direct drive speed ratio to the intermediate underdrive speed ratio requires all of the fluid released from the release side of the intermediate brake servo to be passed through a high speed orifice. When a corresponding shift occurs at lower speeds, it allows a parallel distribution of pressurized clutch and brake servo fluid through a high speed orifice and a low speed orifice arranged in parallel disposition.

BRIEF DESCRIPTION OF THE FIGURES OF THE DRAWINGS

FIG. 3 is a chart that shows the engagement and release pattern for the clutches and brakes of the transmission in FIG. 1 during ratio changes.

PARTICULAR DESCRIPTION OF THE INVENTION

Figure 1:
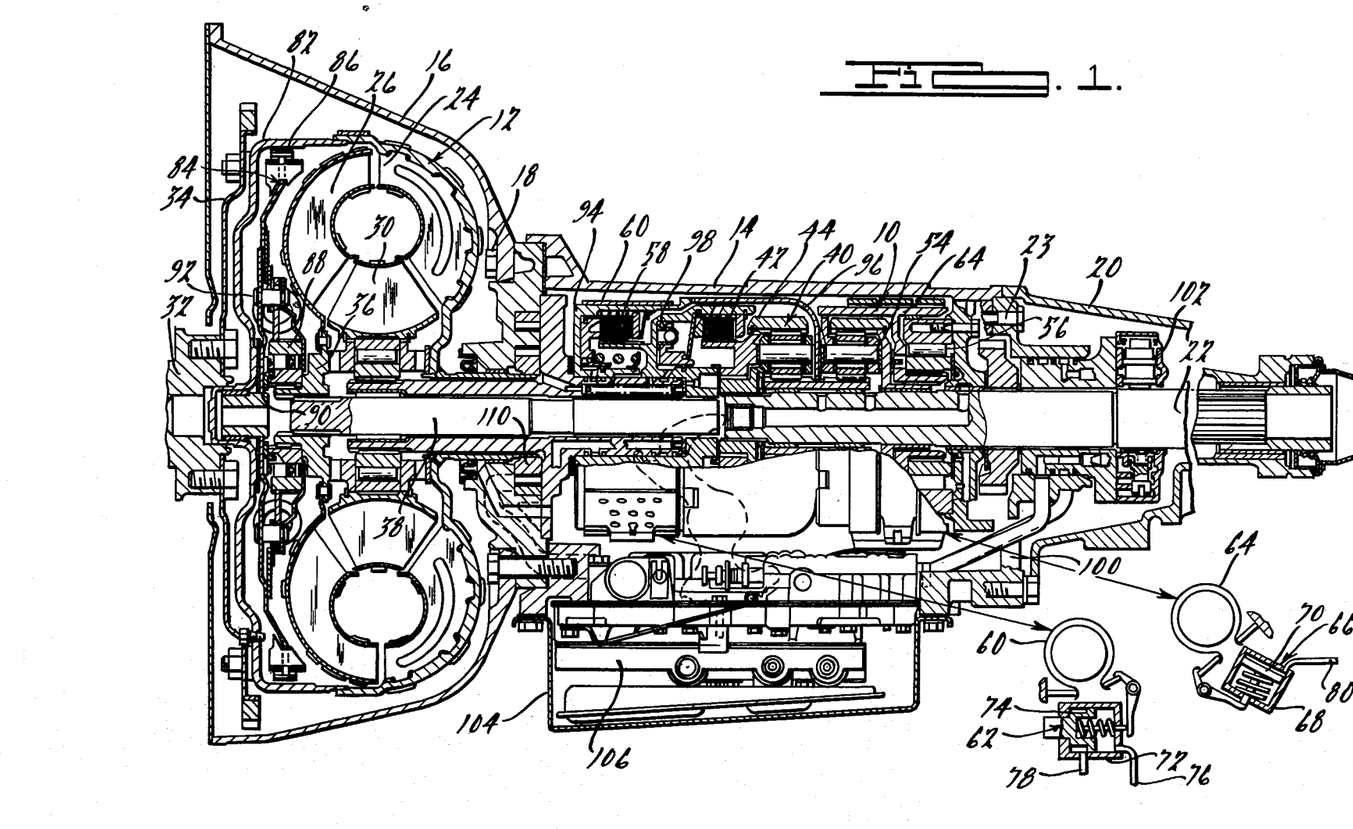
FIG. 1 shows a cross-sectional assembly view of a planetary gear transmission having a control system capable of embodying the improvements of my invention.
Figure 2:
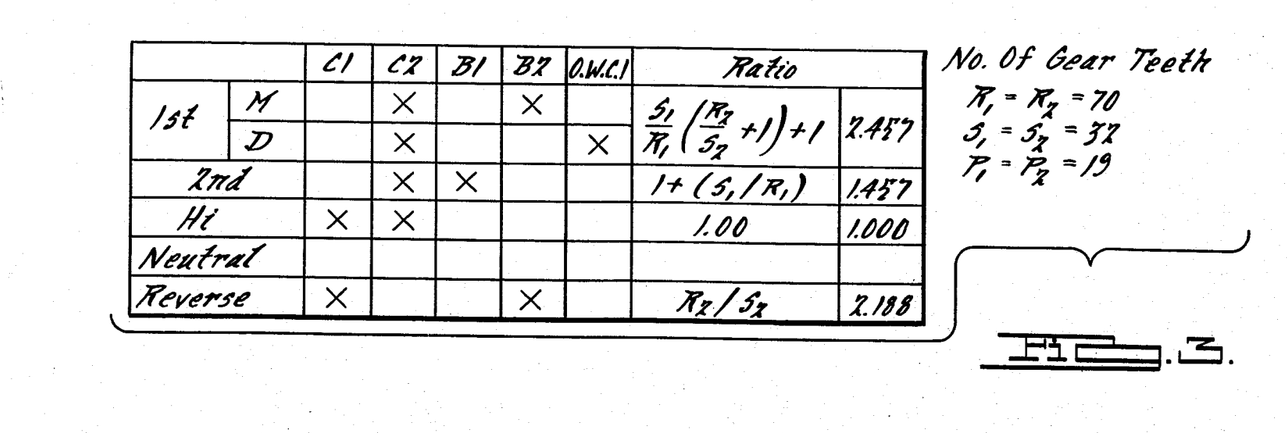
FIG. 2 is a schematic representation of the transmission of FIG. 1.

In FIG. 1 reference numeral 10 designates multiple ratio planetary gearing and reference numeral 12 designates a hydrokinetic torque converter. The gearing 10 is enclosed by a main gear housing 14 and the converter 12 is enclosed by a converter housing 16. The housing 14 and the housing 16 are joined by bolts as shown at 18 to provide a complete transmission casing. A tailshaft extension housing 20 secured by bolts 23 to the opposite end of the housing 14 encloses a driven shaft 22. The converter 12 comprises a bladed impeller 24, a bladed turbine 26 and a bladed stator 30 arranged in the usual fashion in a torus circuit. The impeller 24 is connected to an engine crankshaft 32 for an internal combustion engine, the connection being provided by drive plate 34.

Turbine 26 includes a turbine hub 36 which is splined to turbine shaft 38.

Planetary gearing 10 includes two simple planetary gear units 40 and 42 each having a ring gear, a sun gear and a carrier that rotatably supports pinions that engage its sun and ring gears. Turbine shaft 38 is connected to ring gear 44 of gear unit 40 through a forward clutch 41. Sun gear 46 of gear unit 40 is connected directly to sun gear 48 of gear unit 42. The carrier 50 of gear unit 40 is connected to ring gear 52 of gear unit 42. Ring gear 52 and carrier 50 are connected to the output shaft 22. Carrier 54 of gear unit 42 is adapted to be braked to the housing 14 through an overrunning brake 56 to establish a torque reaction point during low speed ratio operation. Carrier 54 carries pinions that engage drivably the ring gear 52 and the sun gear 48. Similarly, carrier 50 carries pinions that drivably engage ring gear 44 and sun gear 46.

Turbine 26 and turbine shaft 38 are adapted to be connected to the sun gears 46 and 48 through a high speed ratio and reverse drive clutch 58. Sun gear 46 acts as a reaction point during intermediate speed ratio operation and is held fast by friction brake 60 which is applied and released by an intermediate speed ratio brake servo 62.

Brake band 64 surrounds a brake drum that is integral with carrier 54. It is applied during low and reverse drive operation to anchor the carrier 54. During low speed ratio operation, brake 64 may complement the action of the overrunning brake 56 thus conditioning the transmission for coast braking.

Brake band 64 is applied and released by servo 66 which is a single acting servo having a cylinder 68 and a piston 70 that is adapted to apply a force to the operating end of the brake band 64. The servo 62 on the other hand is a double acting servo having a servo cylinder 72 and a double acting servo piston 74. The piston 74 and the cylinder 72 define a pair of opposed pressure chambers, pressure passage 76 extending to the brake release pressure chamber and pressure passage 78 extending to the brake apply pressure chamber. The brake apply pressure chamber has a smaller effective area, as seen in FIG. 1, than the effective area of the brake release pressure chamber. Thus when both pressure chambers are pressurized, brake band 60 becomes released. When the apply pressure chamber is pressurized and the release side of the brake piston is vented, the brake becomes applied.

Fluid pressure is admitted to the single pressure chamber for the low and reverse brake band servo 66 through pressure passage 80.

Crankshaft 32 drives impeller housing 82 which forms a part of the impeller assembly and which encloses the turbine 26. A centrifugally actuated lockup clutch mechanism 84 is located within the impeller housing. At high impeller speeds the clutch assembly 84 effects a driving connection between the impeller and the turbine thus establishing a mechanical torque flow path that bypasses the hydrokinetic converter 12. Clutch assembly 84 comprises centrifugally operated elements on its periphery, schematically shown at 86, and a clutch hub 88 that is connected to the turbine hub 36 with an overrunning clutch 90. A damper and spring cushion assembly 92 forms a part of the clutch assembly. The assembly 92 cushions the engagement of the clutch as a mechanical torque delivery path is established. For a complete description of the mode of operation of the centrifugally operated clutch 84, reference may be made to U.S. Pat. No. 4,226,309, dated Oct. 7, 1980.

Clutch 58 comprises an annular cylinder 94 in which is positioned an annular piston that cooperates with the cylinder to define a pressure chamber. When fluid pressure is admitted to the pressure chamber, the clutch discs of the clutch 58 frictionally engage thereby establishing a driving connection between turbine shaft 38 and the sun gears 46 and 48 through the drive shell 96. Clutch 42 likewise comprises an annular cylinder and an annular piston that cooperate to define a single acting pressure chamber which, when pressurized, frictionally engages the friction discs of the clutch 42 to establish a driving connection between turbine shaft 38 and ring gear 44. Turbine shaft 38 is connected drivably to annular cylinder 98.

Carrier 50 of the gear unit 40 and ring gear 52 of the gear unit 42 each is connected to the tailshaft or output shaft 22, the latter extending through an end plate 100 secured to the end of housing portion 14. A fluid pressure governor assembly 102 is connected drivably to the output shaft 22 thus providing a pressure signal that is representative of the vehicle speed. Shaft 22 is connected through a usual drive shaft and differential mechanism to the vehicle traction wheels.

The fluid valve control system for controlling the ratio changes for the transmission of FIG. 1 is located in a transmission sump 104 at the base of the housing portion 14. It encloses a valve body 106 which contains the valve elements that are illustrated schematically in FIGS. 4A, 4B and 4C. The power steering control system includes a positive displacement pump 110 which is connected drivably to the impeller in the usual way.

In the chart of FIG. 3 the symbols $C_1$, $C_2$, $B_1$, $B_2$ and $OWC_1$ designate generally clutch 58, clutch 42, brake band 60, brake band 64 and overrunning coupling 56, respectively.

As seen in FIG. 3, clutch $C_2$ is engaged during operation in each of the forward driving ratios. To establish the lowest speed ratio brake band 64 is applied. This causes the carrier 54 to act as a reaction point during engine braking. It also complements the action of the overrunning brake 56 as forward driving torque reaction is distributed to the carrier 54.

A ratio change to the intermediate underdrive ratio is obtained by engaging brake band $B_1$. When brake $B_1$ becomes engaged, overrunning coupling 56 freewheels. Torque delivered from the turbine and through the clutch to the ring gear 44 is multiplied by the gear unit 40 as the sun gear 46 acts as the reaction point. Carrier 50 acts as a torque output element. Operation of the gearing in the underdrive low speed ratio is a split torque delivery path through the gearing with sun gear 46 being driven in a reverse direction. This also drives the sun gear 48 in the reverse direction as positive driving torque is delivered to the carrier 50. Positive driving torque is delivered to the output shaft 22 through the gearing 42 as the ring gear 52 is driven by the sun gear 48 in a forward driving direction.

Direct drive is achieved by disengaging both brakes and engaging both clutches, thus locking together the elements of the gearing for rotation in unison.

Brake band 64 is applied by servo 66 when fluid pressure is admitted to the single acting working chamber of servo 66. It is released by the spring as indicated in FIG. 1 as the passage 80 is exhausted. Brake band 60 is applied when fluid pressure is admitted to the apply side of the servo 62 through passage 78 as passage 76 is exhausted. When both pressure chambers on either side of the piston 74 are pressurized, servo 62 assumes a brake release condition since the effective working area on the release side of the piston is greater than the effective working area on its apply side. As the piston 74 is stroked to a brake release position, fluid is displaced from the apply side of the servo through passage 78. Similarly, when servo 62 is applied, fluid on the release side of the piston 74 is displaced through passage 76. Passage 76 is in fluid communication with the servo for clutch 58 as will be explained with reference to FIGS. 4A and 4B. The rate of fluid displacement during 1-2 upshifts and 3-2 downshifts is controlled by the servo release shuttle valve, the 3-2 timing valve and the 1-2/3-2 timing control valve as will be explained with reference to FIGS. 4A, 4B and 5. The valve elements of these figures are contained in the valve body 106 shown in FIG. 1.

Figure 4A:
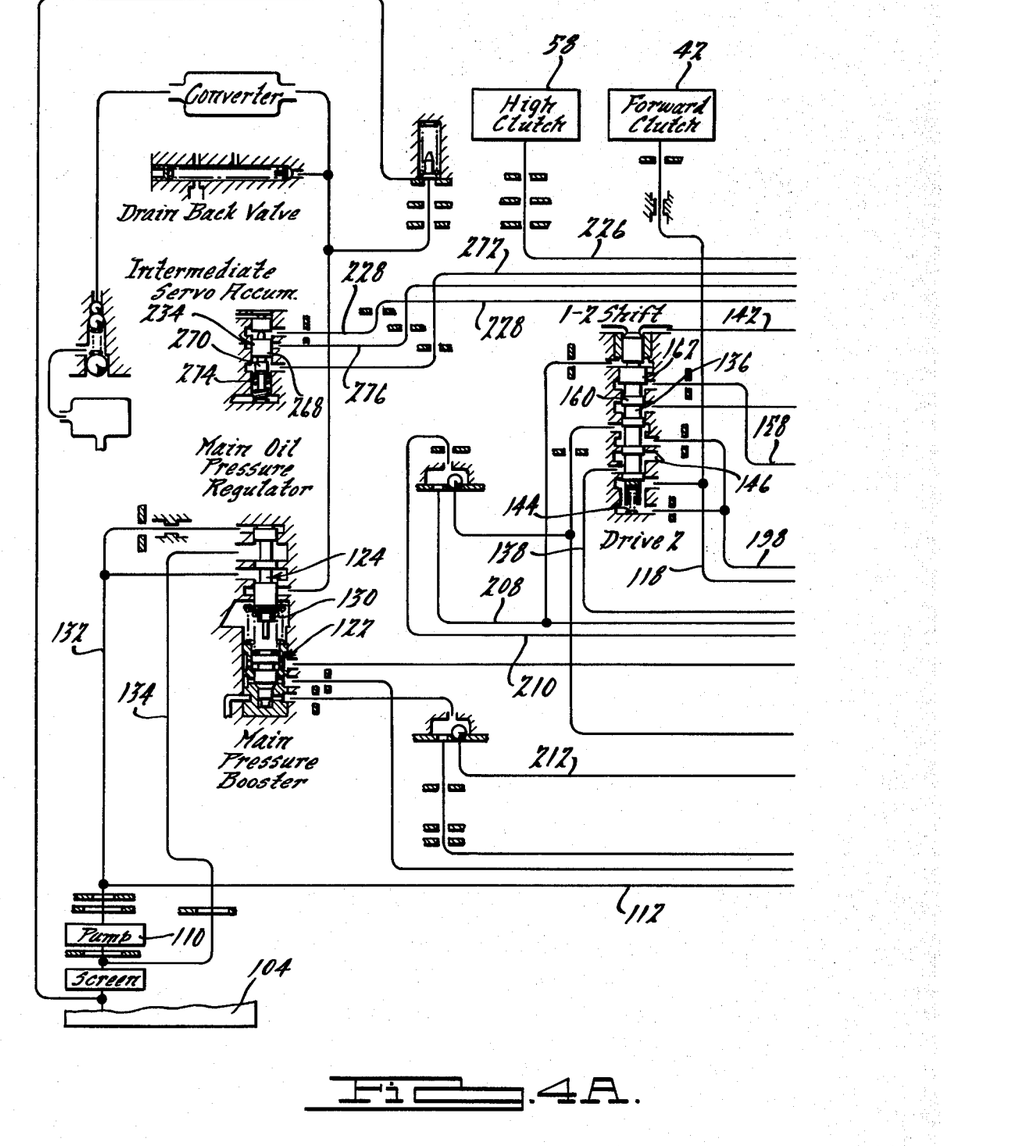
FIGS. 4A, 4B and 4C show a control system for controlling the clutch and brake elements of the transmission of FIG. 1.

Pump 110 shown in FIG. 4A develops a circuit pressure and its output side communicates through passage 112 with transmission manual valve 114 which is under the control of the operator. Valve 114 is adjustable to a position corresponding to each of the drive modes; namely, the reverse position R, the neutral position N, the automatic forward drive range position D, the intermediate drive range position 2 and the low speed ratio position L. When it is in either the L position or R position, the manual valve 114 distributes pressure from passage 112 to passage 116. Forward drive clutch pressure for clutch 42 is distributed by the manual valve 114 to passage 118. Reverse line pressure is distributed by the manual valve to passage 120 which extends to the main line pressure booster 122 located at the base of the main oil pressure regulator 124. Passage 116 also is pressurized during reverse operation as it is during low speed ratio operation with the manual valve in the L position. When the manual valve is in the L position, passage 126 also is pressurized. When the manual valve is in the 2 position, passage 128 is pressurized.

The valve elements of FIGS. 4A, 4B and 4C, except for the timing control valves, will be described only briefly to provide an understanding of an environment for the timing valve system of my invention. For further description of valve elements of the kind shown in FIGS. 4A, 4B and 4C, reference may be made to U.S. Pat. Nos. 3,714,836 and 3,400,612, which are assigned to the assignee of this invention.

Regulator 124 comprises a valve spool which is urged in an upward direction, as seen in FIG. 4A, by valve spring 130. Regulator 124 receives high pressure fluid from the output side of the pump 110 through passage 132. Passage 134 is an exhaust passage which connects the regulator with the low pressure side of the pump and with the transmission sump indicated by reference character 104 in FIG. 1. Application and release of the intermediate speed ratio brake servo during an upshift from the low speed ratio to the intermediate speed ratio is controlled by the 1-2 shift valve 136. This valve receives line pressure from passage 118, previously described. When the valve 136 assumes the position shown in FIG. 4A, communication between passage 118 and passage 138 is interrupted. Passage 138 communicates with the apply side of the intermediate servo 62 through the 2-3 backout valve 140.

Governor pressure from the governor 102 is distributed to the upper end of the 1-2 shift valve assembly through passage 142. The force developed by that governor pressure is opposed by the force of valve spring 144; and when the governor pressure is low enough, the valve assumes the position shown, which allows the passage 138 to be exhausted through the exhaust port 146 in the 1-2 shift valve. Governor pressure in passage 142 acts also on the upper end of the 2-3 shift valve 148 and develops a force that is opposed by valve spring 150. This same pressure is distributed to the 1-2 shift valve through passage 158 and to the differential area on the 1-2 shift valve assembly defined by valve lands 160 and 162 thereby establishing a force that complements the action of the spring 144.

The release side of the intermediate servo communicates with the 2-3 shift valve assembly through passage 164. Located in this passage 164 is a small bleed orifice 166 which permits unrestricted pressure distribution to the release side of the servo but which permits only a minor flow through a small bleed orifice in the opposite direction. When the valve 148 assumes the position shown in FIG. 4A, passage 164 is connected to exhausted passage 168. Passage 168 is exhausted whenever the manual valve is in the drive position D.

The throttle pressure that acts on the shift valves is developed by a throttle pressure valve 170 which is actuated by manifold pressure responsive servo 172. Servo 172 includes a flexible diaphragm. The right hand side of the diaphragm is in communication with the engine intake manifold. The opposite side of the diaphragm is connected to a valve stem 174 which applies a valve actuating force to valve spool 176. Line pressure is distributed to the throttle valve assembly 170 through passage 178, which communicates with the previously described passage 112. The assembly 170 modulates the pressure in the passage 178 to produce a throttle valve pressure in passage 180. This communicates with cutback valve 182 which comprises a valve spool, the lower end of which is subjected to governor pressure that is distributed to it through passage 184 which in turn communicates with governor pressure passage 142.

The cutback valve 182 establishes communication between throttle pressure passage 186 and passage 188, the latter extending to the main pressure booster valve 122 and develops a pressure force on the lower end of the pressure booster valve that tends to increase the effective spring force acting on the regulator 124, thus establishing a regulated line pressure that increases upon an increase in throttle pressure. Valve 182 is subjected to governor pressure, and this is opposed by the force of the throttle pressure acting on the differential area of valve lands 190 and 192. Upon an increase in vehicle speed for any predetermined throttle setting, the valve 182 will shift thereby interrupting communication between passage 186 and passage 188 and simultaneously establishing communication between passage 188 and passage 194, which is exhausted.

When the manual valve is in the drive mode D, passage 194 communicates with passage 168. That passage is exhausted through the porting in the manual valve when the manual valve is in the position shown or in the D position. During acceleration of the vehicle and after it has achieved a predetermined speed that would correspond to a reduced torque converter multiplication, the pressure boosting effect of the throttle pressure acting on the main pressure booster is eliminated and the main oil pressure regulator valve maintains a lower circuit pressure to correspond to the reduced torque requirements of the friction clutches and brakes.

The low servo modulator 196 communicates with the passage 116 through the 1-2 shift valve and through passage 198, and it receives line pressure through that flow path when the manual valve is in the low position L. The modulator 196 modifies that pressure to produce a modified pressure in passage 200 which communicates with the low and reverse servo. Optimum pressure in the servo thus can be obtained when the manual valve is moved to the L position thus improving the quality of the ratio shift to that low ratio.

The throttle downshift valve 202 is effective to distribute line pressure from passage 112 to passage 204 when the engine throttle is advanced to an advanced throttle setting. Simultaneously communication between passage 204 and exhausted passage 206 is interrupted. Passage 206 is exhausted through passage 208 which communicates with exhaust ports in the manual valve. On a forced downshift at advanced throttle settings line pressure acts on the 2-3 shift valve as well as the 1-2 shift valve so that these valves are urged toward their downshift positions which are shown in FIG. 4B.

Throttle pressure from passage 180 is distributed through the check valve 182 to the upper end of the line pressure coasting boost valve 209 which renders the valve inactive when the valve is in the reverse drive mode. When the manual valve is in the manual intermediate position 2 and the vehicle is in a coasting mode, pressure from passage 208 is distributed to passage 210. That pressure acts on the differential area of the lands of valve of 209 causing a modified pressure to be distributed through passage 212 to the main pressure booster thereby augmenting the regulated line pressure when the vehicle coasts at high speeds with a minimum throttle setting.

Figure 5:
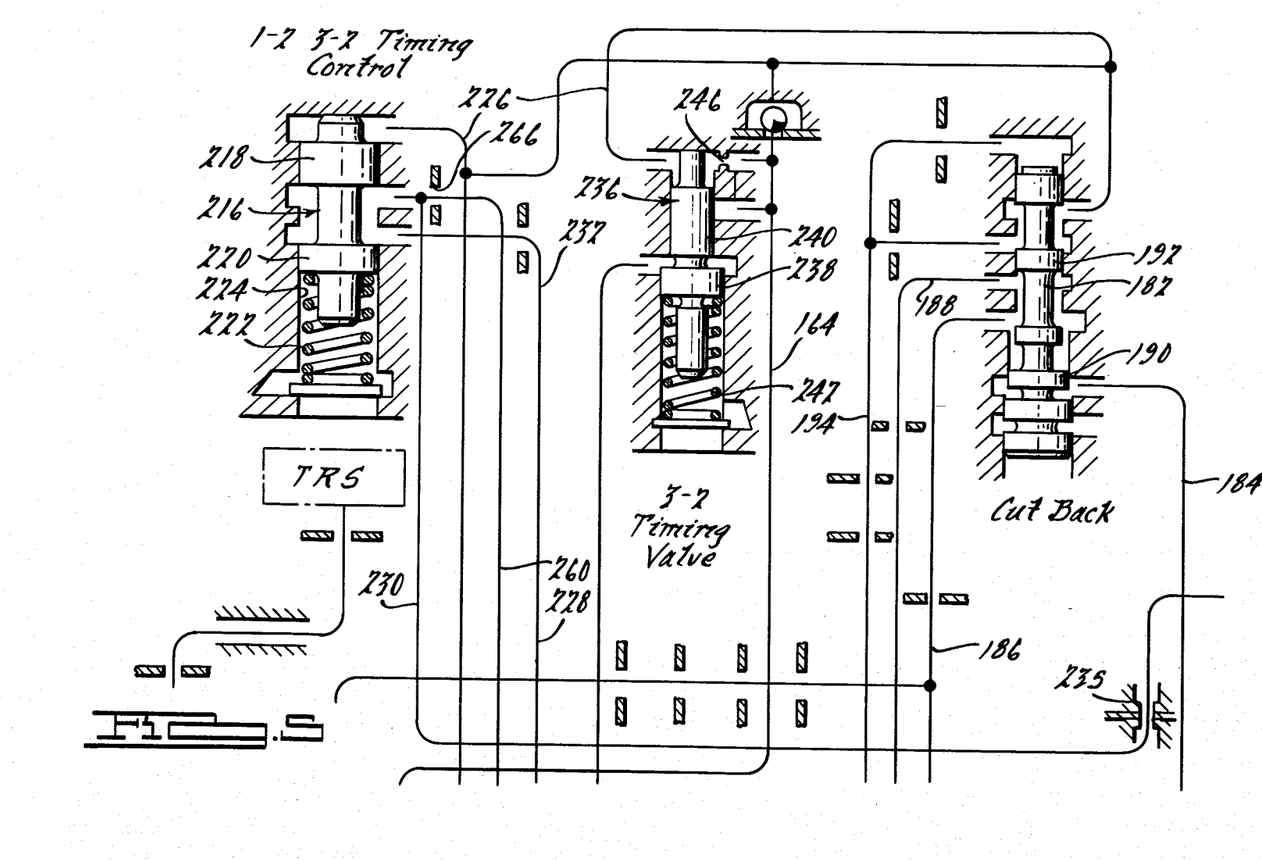
FIG. 5 shows an enlargement of the 3-2 timing control valve, the 3-2 timing valve and the cutback valve shown in FIG. 4B.

The shift timing feature that constitutes the improvements of my invention includes a 1-2/3-2 timing control valve 216. Valve 216 comprises a valve spool having spaced valve lands 218 and 220. The spool is urged in an upward direction by valve spring 222. The lower end of the valve chamber 224 in which the spool 216 is situated is exhausted as indicated. The upper end of land 218 communicates with passage 226. When the valve is positioned as shown in FIG. 5, valve spool 216 establishes controlled communication between passage 228 and passages 230 and 232 the latter extending to the intermediate servo accumulator 234, which will be described with reference to A subsequent description of a 1-2 upshift.

Passage 230 extends to the release side of the intermediate servo 62. Included in passage 230 is a high speed control orifice 235. Passage 226 extends to the high speed ratio clutch 58. Thus when the high speed clutch is pressurized, as it is during direct drive operation, valve spool 216 will be urged in a downward direction so that passage 230 is brought into communication with passage 226 through the timing control valve.

A 3-2 timing valve 236 comprises a valve spool having spaced lands 238 and 240 located in a valve bore. The lower end of the bore receiving valve spring 242. Governor pressure acts on a differential area of lands 238 and 240 and is distributed to that area through passage 244. Passage 244 communicates with the governor pressure passage 142.

Passage 226 extends to the upper end of the land 240. Passage 226 communicates with passage 164 through control orifice 246. Valve land 240 provides a controlled communication between passage 226 and passage 164, and this path is in parallel disposition with respect to the flow path of orifice 246. The amount of the bypass flow is dependent upon governor pressure in passage 244. The higher the speed the greater the bypass flow.

Figure 4B:
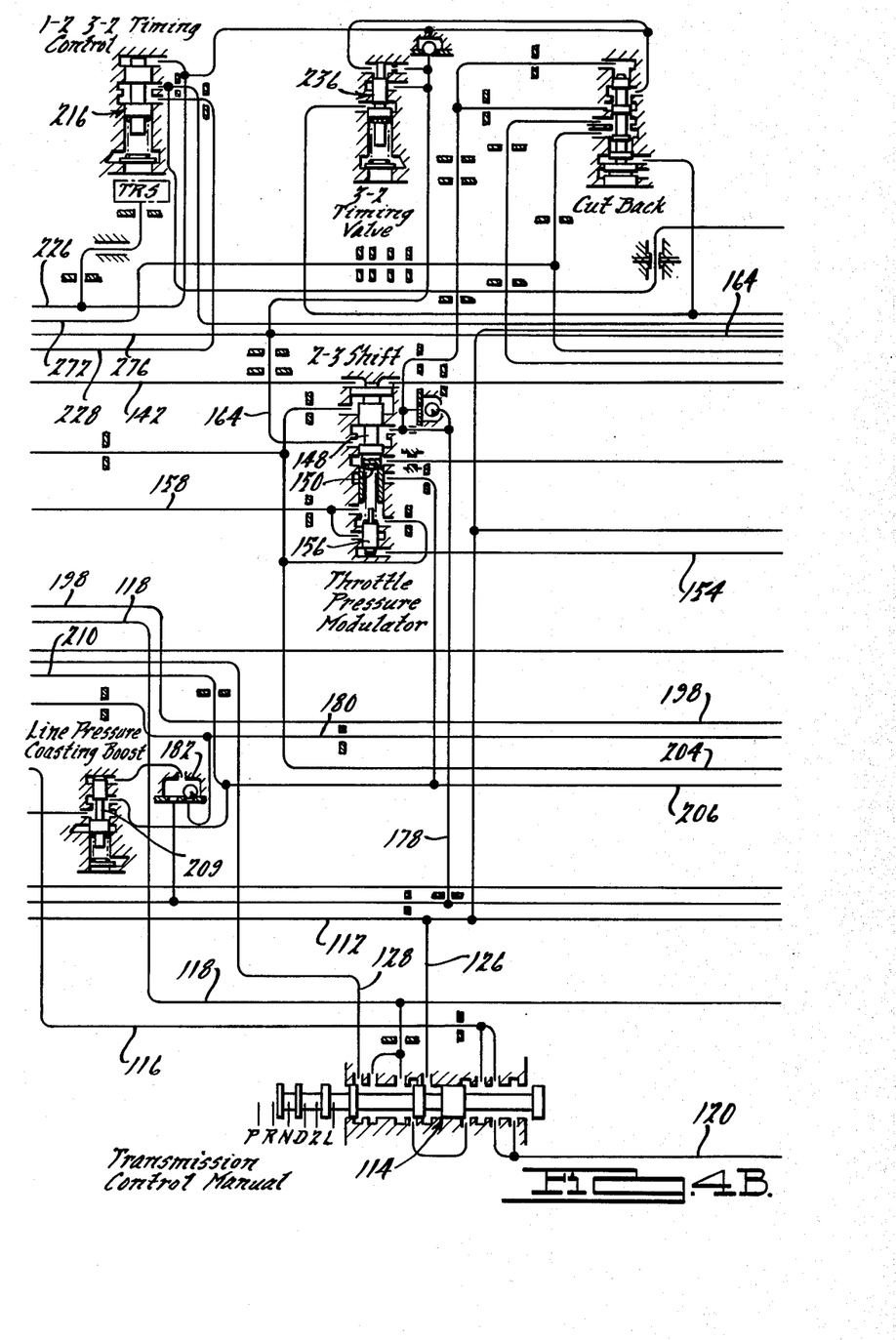

Passage 164 is exhausted through the 2-3 shift valve when the 2-3 shift valve assumes the downshift position illustrated in FIG. 4B, the exhaust flow path including passage 168.

Figure 4C:
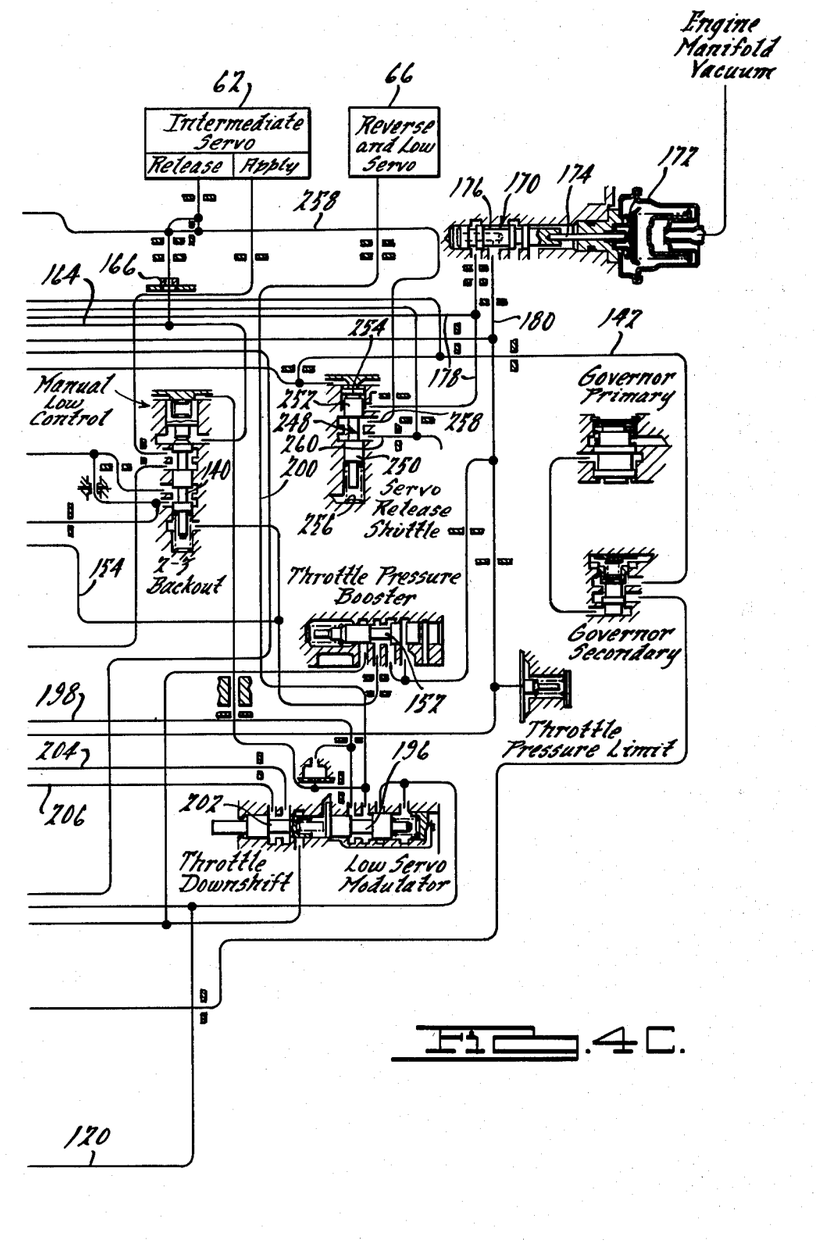

A servo release shuttle valve is shown in FIG. 4C at 248. It comprises a valve spool having three lands 250, 252 and 254. A valve spring 256 urges the valve spool in an upward direction, and that force is complemented by the force developed by line pressure in passage 178. The upper end of land 254 is subjected to governor pressure from passage 142. At low vehicle speeds the valve 248 is positioned as shown. At high speeds it is moved downwardly thereby interrupting communication between passages 258 and 260 both of which communicate with the valve bore for the servo release shuttle valve. Passage 258 extends directly to the release side of the intermediate servo as shown. Passage 260 communicates with passage 230 as indicated in FIG. 5.

If it is assumed that a downshift occurs from the high ratio to the intermediate ratio at high vehicle speeds when the shuttle valve is in a downward direction, application of the intermediate servo is delayed due to the control of the fluid flow path for the fluid from the release side of the servo. That path comprises the high speed orifice 234 and passage 230. Fluid from the release side of the servo passing through passage 230 is transferred through the 3-2 timing control valve to passage 226 since valve spool 216 at that instant is in a downward position because of the presence of pressure in the high clutch 58. The fluid then passes from passage 226 to the upper end of the 3-2 timing valve and through the orifice 246 to the exhaust passage 164. Passage 164 communicates with the exhaust through the 2-3 shift valve as explained previously.

If it is assumed that the same shift occurs at a low vehicle speed, the servo release shuttle valve will have assumed the position shown in FIG. 4C so that now there are two parallel orifice controlled flow paths for the fluid on the release side of the servo. The first of these paths is the same as that described previously. The second path, which is in parallel with it, includes low speed orifice 266 located adjacent the 2-3 timing control valve. Fluid from the release side of the servo then may pass through passage 258 to passage 260 through the servo release shuttle valve through orifice 266 and then through the same flow path described earlier. A shorter interval then will occur between the release of the clutch 58 and the application of the servo 62. A greater interval is required if a corresponding shift occurs at a high speed because a greater speed change is required and the engine and the rotating elements of the gearing require more time to accelerate.

As the clutch loses pressure, the 3-2 timing valve is urged upwardly by the force of spring 222. Passages 260 and 230 then are brought into controlled communication with passage 232, which extends to the intermediate servo accumulator. This accumulator, shown at 234, comprises a valve spool having differential lands 268 and 270. The presence of throttle pressure on the differential area of lands 270 and 268 delays the stroking of the intermediate servo on the shift. Thus more cushioning and accumulating action occurs when the downshift takes place at advanced throttle settings in comparison to a corresponding shift at light throttle settings. The presence of the small bleed orifice 166 will allow the residual release pressure to be drained to the exhaust passage 164 after the intermediate servo is fully applied on a downshift.

Thus both throttle pressure and governor pressure are used by the timing valve system to control the cushioning action of the servo 62 and to control the release of the clutch 58. The presence of governor pressure on the 3-2 timing valve allows for that speed calibration. The presence of governor pressure on the servo release valve permits a different calibration for a shift at high speeds relative to the calibration for a shift at low speeds, and that speed calibration is independent of the speed calibration of the 3-2 timing valve.

Having described a preferred embodiment of my invention, what I claim and desire to secure by U.S. Letters Patent is:

1. In a transmission control system for planetary transmission gearing adapted for multiple ratio torque delivery from a vehicle engine to a driven shaft, said transmission having fluid pressure operated clutches and brakes for establishing the various ratios:
   a fluid pressure operated brake servo adapted to anchor one element of said gearing to effect a ratio change to an intermediate speed ratio, said servo having a cylinder and a double acting brake cylinder cooperating with said cylinder to define a brake release pressure chamber and a brake apply pressure chamber;
   a fluid pressure operated clutch adapted to connect together two elements of said gearing to establish a high speed ratio;
   a control pressure source;
   a governor valve means for developing a speed pressure signal;
   a valve circuit providing controlled communication between said pressure source and said brake servo and between said pressure source and said clutch, said clutch and said brake release chamber being connected;
   a timing control valve means in said circuit for regulating the pressure in said clutch and in said brake release chamber during a ratio change from said high speed ratio to said intermediate speed ratio;
   a shift valve means for distributing selectively fluid pressure to said apply pressure chamber and exhausting pressurized fluid from said release chamber and said clutch to effect said ratio change;
   a high speed orifice and a low speed orifice situated in parallel relationship in the exhaust fluid flow path for said release chamber; and
   a speed pressure signal sensitive servo release shuttle valve means in the exhaust flow path that includes one of said orifices for blocking said one orifice at high speeds thereby increasing the servo apply time during a ratio change.

2. The combination as set forth in claim 1 wherein said timing control valve means comprises a movable valve spool having an inactive position and a regulating position, and a valve spring acting on said spool to urge it toward said inactive position 3. The combination as set forth in claim 2 wherein said brakes include a low speed ratio brake adapted to establish a low speed ratio reaction in said gearing, a pressure area on said valve spool subjected to the pressure in said clutch whereby a relatively unrestricted flow path for the pressurized fluid in said release chamber is established upon a ratio change from said low speed ratio to said intermediate speed ratio.

4. The combination as set forth in claim 3 wherein said circuit comprises an intermediate servo accumulator valve means for modulating the pressure of the fluid displaced from said release chamber and passed through said timing control valve means whereby the intermediate servo release time is extended.

5. The combination as set forth in claim 4 wherein said circuit includes a source of throttle pressure that is proportional to torque applied to a torque input element of said gearing, said intermediate servo accumulator having a throttle pressure area thereon, a throttle pressure passage connecting said throttle pressure source to said throttle pressure area whereby the accumulator effect is increased upon an increase in throttle pressure to increase the intermediate servo application time during a shift interval.

* * * * *